United States Patent [19]

Kroll et al.

[11] Patent Number: 4,594,081
[45] Date of Patent: Jun. 10, 1986

[54] GAS SCRUBBER

[75] Inventors: Walter Kroll, Wilhelm-Busch-Strasse 13, D-7510 Backnang; Paul Christian, Bad Friedrichshall-Untergriesheim, both of Fed. Rep. of Germany

[73] Assignee: Walter Kroll, Backnang, Fed. Rep. of Germany

[21] Appl. No.: 577,126

[22] Filed: Feb. 6, 1984

[30] Foreign Application Priority Data

Feb. 5, 1983 [DE] Fed. Rep. of Germany ....... 3303874
Jul. 5, 1983 [DE] Fed. Rep. of Germany ....... 3324124
Jul. 5, 1983 [DE] Fed. Rep. of Germany ....... 3324123

[51] Int. Cl.$^4$ .............................................. B01F 3/04
[52] U.S. Cl. .......................................... 55/222; 55/230; 55/257 R; 55/228; 261/88; 261/91; 261/17
[58] Field of Search ...................... 55/230, 222, 257 R, 55/228; 261/88, 91, 17

[56] References Cited

U.S. PATENT DOCUMENTS

| | | | |
|---|---|---|---|
| 217,294 | 7/1879 | North | 55/230 |
| 701,619 | 6/1902 | Riecke | 55/230 |
| 1,098,389 | 6/1914 | Lister | 261/88 |
| 1,579,807 | 4/1926 | Ballow | 261/88 |
| 1,685,221 | 9/1928 | Bahnson | 55/230 |
| 2,143,628 | 1/1939 | Lea | 55/230 |
| 2,176,174 | 10/1939 | Gelakoski | 261/88 |
| 3,444,669 | 5/1969 | Panzica et al. | 55/230 |
| 3,678,658 | 7/1972 | Bayze | 55/230 |
| 3,701,237 | 10/1972 | Smuck | 55/230 |
| 3,853,515 | 12/1974 | Davis | 261/90 |
| 4,371,477 | 2/1983 | Karowiec et al. | 55/230 |

FOREIGN PATENT DOCUMENTS

| | | | |
|---|---|---|---|
| 1125623 | 3/1962 | Fed. Rep. of Germany | 55/230 |
| 3122026 | 1/1983 | Fed. Rep. of Germany | |
| 3324124 | 8/1984 | Fed. Rep. of Germany | 55/230 |
| 597992 | 9/1925 | France | 55/230 |

*Primary Examiner*—Tim Miles
*Attorney, Agent, or Firm*—Michael J. Striker

[57] ABSTRACT

Gases that are to be scrubbed, particularly flue gases, pass through an inlet line (14) into a processing area (9) wherein the gases are exposed to the effects of a scrubbing agent that is contained in a bath (4). To this end, the liquid is sprayed by means of a rotating disc arrangement (17), the discs of which are coated—preferably through a hollow shaft (18)—with a layer of the scrubbing agent, this coating then being separated from the rotating discs as a result of centrifugal forces, with the attendant formation of an annular spray zone. The gas scrubber can trap sulfur dioxide that is contained in the flue gases. To this end, water is used as the scrubbing agent, and sodium carbonate (soda) is added to this. The sodium carbonate is converted with the water and with the carbon dioxide that is contained in the flue gas to hydrosodic carbonate, and this, together with the sulfur dioxide that is contained in the flue gas forms sodium sulfate if oxygen or additional air is introduced through the opening (26) into the processing area (9), and this sodium sulfate then collects on the bottom of the bath (4) in the form of a sediment.

14 Claims, 3 Drawing Figures

GAS SCRUBBER

BACKGROUND OF THE INVENTION

The present invention relates to a gas scrubber, particularly for the flue gases from heating plants, this scrubber having a processing area through which the gases pass and in this a rotating disc arrangement that rotates about a vertical axis and is installed as a spray system, it being possible to coat this disc arrangement, preferably through a hollow shaft that bears the discs, with a scrubbing agent that is to be sprayed, with the formation of a layer of liquid that adheres to the disc arrangement and is separated from it by the effects of centrifugal force, moving outwards in so doing so as to form an annular spray zone.

A device of this kind is described in German disclosure No. 31 22 026. The particular advantage of this system lies in the fact that spray nozzles—which in other circumstances are always prone to blockage—are not required in this particular system. The scrubbing agent that is to be sprayed is, on the contrary, flung off the disc arrangement, that rotates comparatively fast, at such a speed that very fine droplets of liquid are formed.

However, the construction and design costs of the scrubber described in German Pat. No. 31 22 026 are relatively high since it has to have a special blower in order to maintain the flow of gas that is to be scrubbed through the processing area and at the same time to contribute to the atomisation of the droplets of liquid by the formation of vortices.

For this reason it is the task of the invention to create a gas scrubber that is distinguished by very low construction costs and good fogging of the scrubbing agent and thus very good scrubbing efficiency.

This task has been solved in that the disc arrangement has one or a plurality of preferably perforated discs, these having recesses or aerodynamically effective elements arranged around its periphery, preferably in that the discs are cut repeatedly inwards from the periphery, the blades formed by these cuts being twisted or bent against the plane of the disc or the direction of rotation, respectively, in the manner of propellor blades, at a pitch angle that is such that the gas is displaced radially outwards during rotation, and at the same time in the axial direction of the disc arrangement—preferably downwards against a bath that contains the scrubbing agent—away from the gas inlet area of the processing area.

According to the present invention provision is made such that the same elements that serve to spray the scrubbing agent also serve to move the gas that is to be scrubbed through the processing area. This also causes intensive agitation of both the gas that is to be scrubbed and the scrubbing agent. For the remainder, the perforations or the aero dynamic elements, respectively, as well as the propeller blades form, in each case, separation edges, on which the film of liquid that adheres to the discs separates most effectively during spraying.

The preferred blades are twisted so as to resemble propellor blades, and the perforations themselves, can be produced with the simplest tools.

In an efficient development of the present invention provision can be made such that the disc arrangement is arranged within an annular, preferably stationary cowl, this surrounding the disc arrangement at a radial distance in the direction of rotation, and such that in a disc arrangement incorporating several discs that can be coated with the scrubbing agent the radial distance between the cowl and the edge of the disc is greater in the case of the disc that is furthest removed from the gas input area than is the case of the preceding disc. The cowl forms an impact surface that is constantly wetted by the scrubbing agent and the solids that are carried by the gas that is to be scrubbed impinge on this impact surface and these are then wetted by the scrubbing agent and carried off. The distance between the cowl and the disc, that increases in the direction of flow of the gas that is to be scrubbed contributes to a high throughout of the processing area, in that any "blockage" of the processing area with sprayed or atomised scrubbing agent is counteracted. In this arrangement an increasing cross-section is available to the quantity of the sprayed scrubbing agent, which increases in the direction of flow of the gas that is to be scrubbed.

Furthermore, it is foreseen that the hollow shaft is only supported in the area of its upper extremity, preferably in that the hollow shaft is connected, without its own bearings, directly to the shaft of a motor that is used to drive the disc arrangement, and is supported radially and axially exclusively by means of the motor shaft bearings, and also that the open lower extremity of the hollow shaft is immersed in the bath that contains the scrubbing agent and that by means of the propellor like delivery blades arranged in the open extremity, liquid is picked up from the bath when they rotate, is drawn into the hollow shaft and moved to openings that are arranged in the walls of the hollow shaft, in each instance close to or on the plane of the disc.

In order to use the heat contained in the gas that is to be scrubbed, these gases—preferably prior to their introduction into the processing area—can be passed through a heat exchanger, this being most expediently arranged in such a manner that the condensate that forms on it can drip into the bath, e.g., in that the heat exchanger is arranged within an annular space that surrounds the processing area, the said annular space being delimited below by the surface of the bath. This arrangement is characterized in that the heat that is given off by the heat exchanger is relatively high and the large quantities of heat that are given off on condensation of the contaminants that are in the form of vapour can be utilised simultaneously. The heat exchanger also works as a pre-scrubber, since some of the contaminants are removed from the gas that is to be scrubbed when the steam condenses, before it enters the processing area.

If necessary, additional gas—preferably additional air if flue gases are to be scrubbed—can be introduced into the gas that is to be scrubbed, and a neutralising agent—preferably soda (sodium carbonate) if flue gases are to be scrubbed and water is to be used as the scrubbing agent—can be added to the bath.

In this way, if flue gases are involved, the sulfur dioxide that is contained in the gas can be trapped by the formation of sodium sulfate The sodium carbonate (soda) and the water together form hydrosodic carbonate with the carbon dioxide that is contained in the flue gas and this is converted to sodium sulfate with the oxygen that is contained in the additional air and with the sulfur dioxide that is contained in the flue gas although carbonic acid may be formed at the same time, this, however, decomposes for the most part into carbon dioxide and water.

The bath can be configured as a sedimentation basin, the hollow shaft with its lower, open extremity and the delivery blades that are immersed in the bath being arranged, if necessary, above a baffle plate that is arranged in the bath so as to prevent any agitation of the precipitated solids. The sludge that collects on the bottom of the bath can be moved into a drying container, this preferably being arranged in the gas line that leads to the gas scrubber, particularly if warm or hot gases, such as flue gas, are to be scrubbed.

In order to manage without costly and temperamental sludge pumps, it is possible to produce a partial vacuum within the closed drying container by means of an evacuation system so that the sludge can be moved into the drying container through a suction line that passes from the bottom of the sedimentation basin into the elevated drying container. At the outlet end, the evacuation system opens preferably into the feed line for the gas scrubber for the gas that is to be scrubbed, or into the bath.

The present invention will be described below on the basis of a preferred exemplary version that is illustrated in the drawings appended hereto.

THE BRIEF DESCRIPTION OF THE DRAWINGS

DETAILED DESCRIPTION OF THE PREFERRED EMBODIMENT

Figure 1:
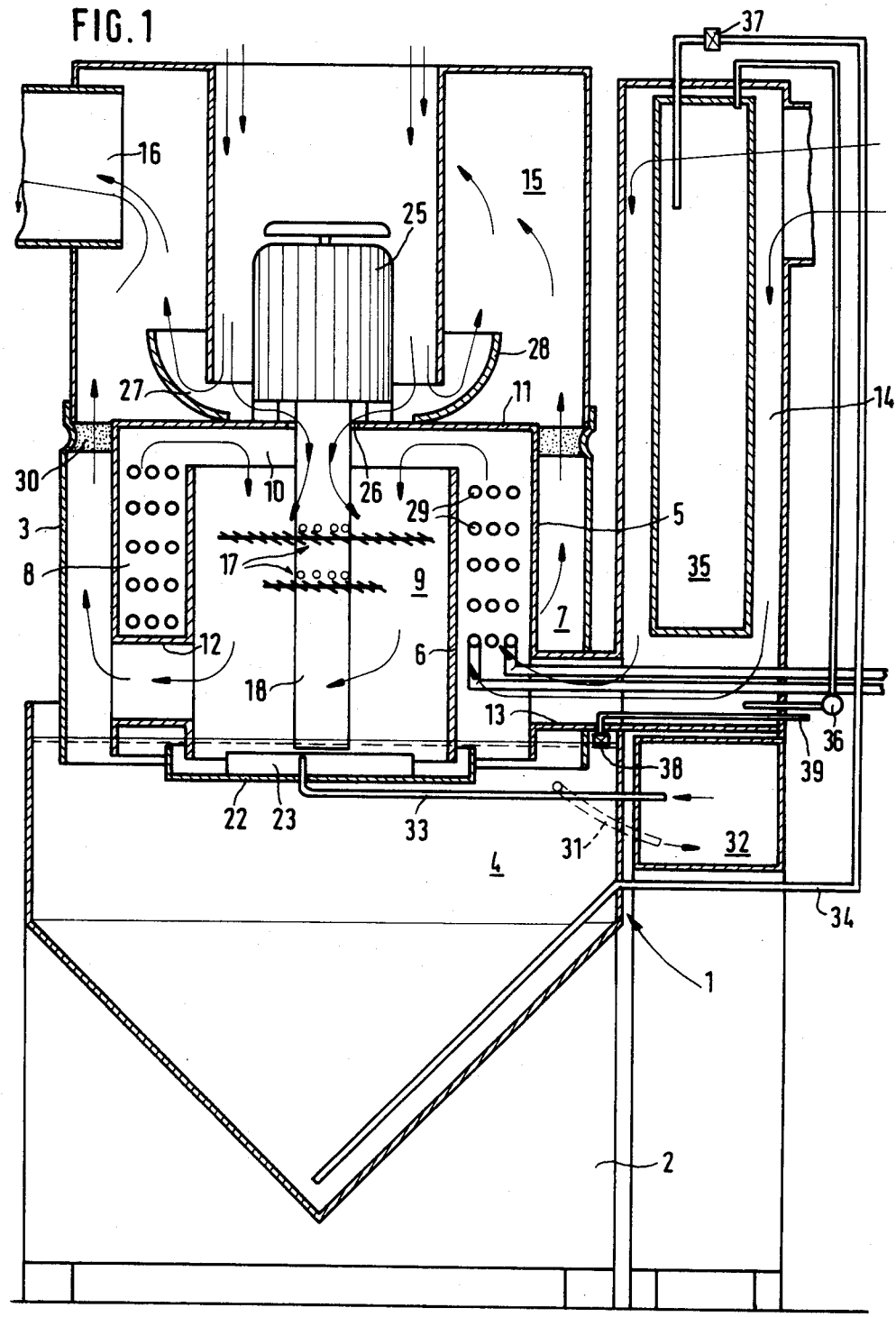
FIG. 1 is a schematic sectional view of the gas scrubber.

According to FIG. 1, the gas scrubber according to the present invention has a housing 1, which is in the main cylindrical, the lower portion 2 of which is configured as a sedimentation basin, and the upper portion 3 of which is open to below; the lower portion of this upper portion 3 is immersed in a bath 4 of scrubbing agent, said bath being housed in the lower portion 2. In the upper portion 3, two concentric and annular spaces 7, 8 are set off by the cylinder walls 5 and 6, and these annular spaces 7, 8, are delimited below by the surface of the bath 4, in which the walls 5 and 6 of the cylinder are immersed.

The annular spaces 7 and 8 enclose a processing area 9 that is arranged together with the annular space 8 through a wide annular gap 10 between the upper edge of the cylinder wall 6 and a base 11 that divides the upper portion 3.

Furthermore, the processing area 9 is connected to the annular space 7 by one or more lines 12 that pass through the cylinder walls 5 and 6 in a radial direction. It is preferred that the lines 12 be configured as a tunnel with walls that are of a U-shaped configuration, the U-arms of which dip into the bath 4 in such a manner that the surface of the bath closes the tunnels that form the lines 12.

The annular space 8 is connected to a supply line 14 for the gas that is to be scrubbed through a radial line 13 which, like the lines 12, can be configured as a tunnel that is closed off from below by the surface of the bath 4.

The annular space 7 opens out above in an annular chamber 15 that is arranged above the base 11, and this chamber opens in its turn to the atmosphere through a blow-off line 16.

The processing area 9 accommodates a disc arrangement 17, this consisting in the main of two discs 19 arranged one above the other on a hollow shaft 18; of these, the upper disc is of a greater diameter than the lower disc. Of these discs, at least the lower is in the form of a perforated disc. Both the discs are cut repeatedly from their outer edges radially inwards, radial blades 20 being formed thereby, and these are then bent or shaped in relation to the plane of the disc, in the manner of propellor blades.

Figure 2:
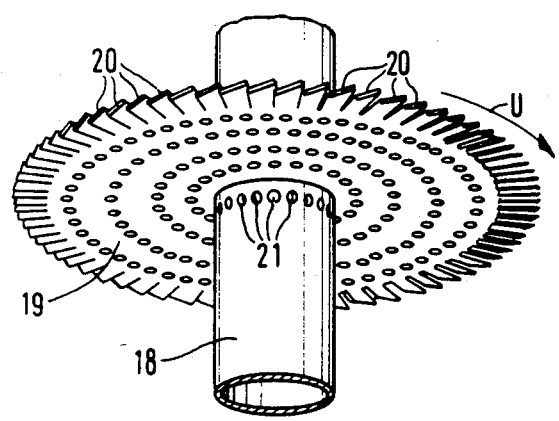
FIG. 2 is a perspective view of the disc of the disc arrangement.

Immediately adjacent to the discs 19 openings 21 are arranged in each instance in the walls of the hollow shaft 18; in FIG. 2 these can be seen only on the underside of the discs, although they can be arranged in the same manner additionally or alternatively above the particular disc 19. The holes 21 are preferably arranged such that the discs 19 form the edges of the holes 21 in some areas.

The discs 19 can be coated through these openings 21 by the scrubbing medium that is contained in the bath 4. In order to permit the supply of scrubbing medium to the openings 21 and thus to the discs 19, a propellor 24 is arranged in the lower, open end of the hollow shaft 19, and this is immersed in the bath 4 so that when the hollow shaft 19 rotates in the direction of rotation U it forces the liquid upwards. In order to prevent the undesired formation of vortices in the scrubbing agent within the bath 4, the lower end of the hollow shaft 18 with the propellor 24 is screened of from the deeper areas of the bath 4 by means of a dish-shaped base portion 22 that is installed immediately beneath the surface of the bath 4. On the upper side of the base portion 4 struts 23 are arranged radially to the axis of the hollow shaft 18 and these prevent an annular flow on the upper side of the base portion 22 when the hollow shaft rotates, thereby increasing the effect of the propellor 24, i.e., increase the possible delivery height of the scrubbing agent within the hollow shaft 18.

A self-cooling electric motor 25 that is mounted on the base 11 is used to drive the hollow shaft 18, and the shaft of this electric motor, connected to the hollow shaft 18 supports the disc arrangement 17, that is arranged without support, both radially and axially. After cooling the motor 25 the current of cooling air that is generated by the fan of the electric motor 25 is divided, part passing through an—for example, annular—opening 26 in the base 11 and into the processing area, and part passing through an annular gap 27 above the base 11, the direction of the current being diverted into the annular chamber 15 by a bell-shaped cowling 28.

The arrangement that has been described operates in the following manner, if, for example, flue gas—from a firing plant not herein illustrated—is to be scrubbed. The flue gases passing through the inlet line 14 pass first into the annular space 7, where they loose much of their heat content to a heat exchanger 29 that is installed there. When this takes place, part of the gaseous impurities in the flue gases condense onto the outer surfaces of the heat exchanger 29, from which the condensate drips into the bath 4 after some time. Thus, on the one hand, the heat exchanger makes it possible to utilise the thermal energy contained in the flue gases, and on the other hand the heat exchanger performs a pre-scrubbing function on the flue gases, for a major portion of the vapours they contain are trapped. Subsequently, the pre-scrubbed flue gases pass into the processing area, where the rotating discs 19 with their propellor-like blades generate a downwards-directed flow as they rotate.

As the disc arrangement 17 rotates, its discs 19 are constantly coated by the liquid through the openings 21, and this separates, mostly on the edges of the holes arranged in the discs and on the outer edge of the discs 19, to form an annular spray zone. Because of the fact that the diameter of the discs 19 decreases towards the bottom of the arrangement any undesired and marked interference with the flue-gas through-put capacity of the processing area 9 has been avoided. This can be explained as follows:

A horizontal (virtual) plane that passes below the upper disc 19 is in the main saturated only with liquid that is sprayed off the upper disc 19. A further horizontal (virtual) plane that passes below the lower disc 19 is, on the other hand, acted upon by a greater quantity of liquid, that is in keeping with the sprayed output of both the discs 19. The amount of free space between the edges of the discs 19 and the walls of the cylinder 6, which increases towards the bottom, thus prevents any "blockage" of the processing area 9 by the sprayed liquid.

Within the spray zones formed by the discs 19 the flue gases that have been agitated by the disc arrangement 17 comes into intimate contact with the sprayed scrubbing agent, so that for all practical purposes all the injurious solids contained in the flue gases are picked up by the liquid. Thus the flue gases are scrubbed intensively.

Subsequently, the scrubbed flue gases pass through the lines or the tunnel 12, respectively, and into the annular space 7, from where they pass into the annular chamber 15. If needs be, a droplet separator 30 can be arranged between the annular space 7 and the annular chamber 15, this being, for example, in the form of a random fleece, by which the droplets that are carried along will be restrained, with the result that after a certain amount of time these will fall back into the bath 4. The small residual amount of moisture in the flue gases condenses in the annular chamber 15 as a result of the cool air that is blown in by the fan of the electric motor 25, which also generates a current of air within the annular chamber 15, which carries the scrubbed flue gas to the blow-off line 16.

The water used as the scrubbing agent is neutralised continuously. To this end, beneath the surface of the bath 4 a line 31 branches off at an incline from the bath 4 so that water can be drawn off from the bath either constantly or when a valve, not shown in the drawings, is opened, and can flow into a process tank 32. Within this tank, soda (sodium carbonate) is added to the water, and the water is then drawn by the action of the propellor through the line 33 that passes from the process tank 32 to a position immediately beneath the propellor 24. Together with the water and the carbon dioxide that is contained in the flue gases, the sodium carbonate is converted to hydrosodic carbonate which then, together with the sulfur dioxide and water contained in the flue gas, and the oxygen contained in the additional air injected through the opening 26, is converted to sodium sulfate. Carbonic acid can be formed at the same time, but for the most part this decomposes to form water and carbon dioxide. Within the bath 4 the solium sulfate forms a sludge precipitate that can be removed by means of a line 34 that passes from the bottom of the bath 4 to a closed drying container 35. To this end, a partial vacuum can be created in the drying container 35 by means of a vacuum pump 36, with the result that the sludgey precipitate on the bottom of the bath 4 can be drawn off and moved into the drying container 35 without the need for a sludge pump or the equivalent. Passage through the line 34 can be controlled by means of a valve 37. Since the drying container 35 is located in the feed line 14 and thus exposed to the heat of the flue gases, the sludge contained in the drying container 35 will dry very rapidly, the resulting steam being passed to the feed line 14 or the bath 4 by means of the vacuum pump 36.

From time to time the drying container 35 must be either cleaned out or replaced, respectively. In order to be able to ascertain without difficulty whether or not the drying container is full, it can be suspended on a weight-sensitive switch that will be activated as soon as the drying container 35 exceeds a prescribed total weight as a result of the dried residue that it contains.

In addition, it will be necessary to replenish the soda, i.e., the sodium-carbonate—which can be delivered to block form—in the process tank 32. Thus, overall, maintenance costs are very slight.

Fresh water is supplied on demand through the line 39 that is controlled by the float valve 38, in order that the liquid level in the bath 4 remains constant.

The gas scrubber described above can also be used to advantage to scrub the flue gas from meat and sausage smoker installations, this flue gas having a high fat content. In this case, a fat or oil binding agent is added to the water contained in the bath 4.

In addition, the gas scrubber can also be used to gasify liquids, in the manner of aerating water. In such a case the bath 4 contains the liquid (for example, water) that is to be gasified, and the appropriate gas (for example, air) passes through the line 14 into the processing area 9.

Unlike the arrangement shown in FIG. 1, the heat exchanger 29 can also be arranged within the processing area 9, close to the cylinder wall 6. Although the heat from the heat exchanger is supplied at a slightly lower temperature it is, however, possible to make the heat exchanger 29 from relatively inexpensive materials in such a case. If arranged in the processing area 9 the heat exchanger 29 is constantly being washed by the scrubbing agent that is sprayed from the disc arrangement 17. This means that the heat exchanger can be of a material that is of comparatively low corrosion resistance, since the danger of corrosion is to a very great extent precluded by the fact that the heat exchanger 29 is constantly being cleaned. A similar arrangement can also be a great advantage if gases that contain particularly aggressive impurities are to be scrubbed.

Furthermore, it is also possible to arrange the heat exchanger 29 within the bath 4. This arrangement, too, entails the advantage that the heat exchanger is exposed to very little danger of corrosion, since by all the rules the scrubbing agent contained in the bath 4 inhibits corrosion. In addition, if the heat exchanger 29 is arranged in this manner it is possible to achieve a particularly small size for the installation since the thermal transfer from the scrubbing agent contained in the bath 4 to the liquid that is passed through the heat exchanger 29 is particularly intensive.

Figure 3:
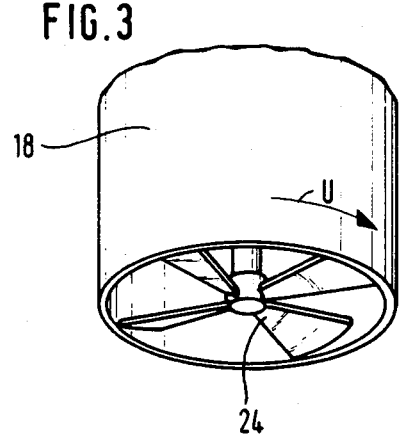
FIG. 3 is a perspective view of the delivery blades in the lower opening of the hollow shaft of the disc arrangement.

Moreover, the elements of the heat exchanger 29 can be configured as plate-like hollow bodies. According to a first variation, these can be arranged in the bath 4 horizontally. Using an arrangement of this sort the base portion 22 shown in FIG. 1 can be eliminated, since the plate-like hollow bodies of the heat exchanger 29 arranged in the bath 4 shield the lower area of the bath 4 against the hollow shaft 18 (cf. FIG. 3) and against the propeller portion 24 arranged therein, so that neither the hollow shaft 18 nor the propellor portion 24 can agitate the deeper areas of the bath 24. Even if the base portion 22 is eliminated, the cross-pieces 23 should be in place in order to achieve a greater pump effect of the propellor portion 24.

It is also possible to arrange the plate-like hollow bodies of the heat exchanger 29 vertically within the bath 4. An arrangement of this kind can be advantageous insofar as any solid precipitate within the bath 4 can sink practically unhindered.

It is preferred that the plate-like hollow bodies of the heat exchanger be produced from two dished portions (arranged in the main symmetrically to each other), these being welded to each other on their outer edges, or joined in some other way. It can also be advantageous to arrange that the hollow bodies be configured as a type of perforated plate, i.e., that the dished portions be welded to each other or otherwise connected in the area of the edge holes. Such an arrangement entails the advantage that the dished portions can be produced from very thin sheet metal since the dished portions support each other in the area of the above-mentioned holes because of the perforated plate-like configuration of the hollow body. Furthermore, even if the plate-like hollow bodies of the heat exchanger are arranged horizontally in the bath 4 these holes mean that any solids present or formed in the bath 4 can sink through the plate-like hollow bodies without any significant hindrance.

Contrary to the version shown in FIG. 1, the annular chamber 15 can be configured without the annular gap 27 or a comparable opening. In this case the cool air supplied by the blower of the electric motor 25 is passed in part through a stand-off space or tubes, respectively, that passes or pass between the base 11 and the annular chamber 15 to the outside of the upper portion 3. In such an arrangement the air current generated by the electric motor 25 simply cools the annular chamber 15 so that residual moisture carried on the flow of scrubbed gas can condense.

If necessary, the upper edge of the cylinder wall 6 can be reversed inwards as a U-shape so that the processing area 9 will be of a comparatively small cross-section at its upper end. By this means the blower effect of the disc arrangement 17 (the propellor-like blades 20 shown in FIG. 2 act as an axial fan) is enhanced, i.e., the flow of the gases passing through the processing area 9 will be increased. This effect can be attributed to the fact that the cross-section of the input side (viewed in the direction of flow of the gases to be scrubbed) of the processing area 9 is of a comparative size to or slightly smaller than the cross-section of the lines 12 and their contiguous annular space 7.

We claim:

1. A gas scrubber, comprising a processing chamber having a gas feeding area; and at least one spraying device positioned in said chamber and including a rotary hollow shaft having a vertical central axis, and a disc arrangement having discs mounted on said shaft to rotate therewith about said axis, said shaft having openings formed adjacent to each disc, said discs being coated with a cleaning liquid passing through said shaft and said openings and adhering to the discs and sprayed from said discs under the action of centrifugal forces outwardly in the form of an annular spray zone, each disc having perforations and being formed at a periphery thereof with recesses forming aerodynamically operating elements, said recesses being formed by cutouts at said periphery, said elements being formed as blades twisted at an adjusted angle relative to a plane of the disc so that gas being cleaned upon the rotation of said discs is forced radially outwardly and also axially of said disc arrangement away from said gas feeding area.

2. The scrubber as defined in claim 1, further including a cylindrical housing accommodating said disc arrangement and surrounding the same at a radial distance therefrom, a radial distance between the periphery of each disc and said housing being greater the remoter is a respective disc from said gas feeding area.

3. The scrubber as defined in claim 1, and further including a drying chamber, said disc arrangement being driven by a motor; and including a blower for cooling said motor, an exhaust gas of said blower being partially fed into said processing chamber and partially into said drying chamber, said drying chamber being connected with said processing chamber for drying a cleaned gas.

4. The scrubber as defined in claim 1, wherein said chamber has a bath filled with the cleaning liquid and positioned below said disc arrangement, the gas to be cleaned being forced downwardly towards said bath.

5. The scrubber as defined in claim 4, for cleaning exhaust gases, wherein an additional air is fed into the scrubber and a neutralizing agent is added in said bath.

6. The scrubber as defined in claim 5, wherein said neutralizing agent is sodium carbonate.

7. The scrubber as defined in claim 4, said bath being formed as a sedimentation basin; and further including a drying container into which sludge, collected at a bottom of said basin, is fed, and a gas line leading to the scrubber and in which said drying container is inserted.

8. The scrubber as defined in claim 7, wherein said drying container is a closed arrangement and is provided with a vacuum pump for producing vacuum in said drying container, and a suction line interconnected between said bath and said drying container so that a sludge collected in said bath can be moved through said suction line from a bottom of said sedimentation basin into said drying container.

9. The scrubber as defined in claim 4, wherein said shaft has an upper end at which the shaft is supported, and a lower end which is immersed in said bath, said shaft being provided at said lower end with propeller blades positioned inside said shaft and forcing the cleaning liquid from said bath through said shaft, and said openings towards said discs.

10. The scrubber as defined in claim 9, wherein said shaft is motor driven and is connected at said upper end immediately to a shaft of a motor for the rotation of said disc arrangement, the shaft of the motor having a bearing for radially and axially guiding said shaft.

11. The scrubber as defined in claim 9, further including a horizontal baffle positioned in said bath, said lower end with said propeller blades being positioned above said baffle, and struts radially projecting from said axis and positioned in said bath, said struts counteracting an annular flow of the liquid of said bath above said baffle when said shaft is rotated.

12. The scrubber as defined in claim 4, further including a heat exchanger which receives the gas to be cleaned, said heat exchanger being arranged so that a condensate formed therein drips into said bath.

13. The scrubber as defined in claim 12, further including a ring-shapd chamber surrounding said processing chamber and housing said heat exchanger, said processing chamber being limited from below by an upper surface of said bath.

14. The scrubber as defined in claim 12, wherein said heat exchanger is arranged so that it receives the gas to be cleaned before it enters said gas feeding area.

* * * * *